(12) United States Patent
Katz et al.

(10) Patent No.: US 9,531,503 B2
(45) Date of Patent: Dec. 27, 2016

(54) REDUNDANCY FOR REAL TIME COMMUNICATIONS

(71) Applicant: Acme Packet, Inc., Bedford, MA (US)

(72) Inventors: Henry Katz, Bedford, MA (US); Prashant Kumar, Bedford, MA (US); Rolando Herrero, Bedford, MA (US)

(73) Assignee: Acme Packet, Inc., Bedford, MA (US)

( * ) Notice: Subject to any disclaimer, the term of this patent is extended or adjusted under 35 U.S.C. 154(b) by 361 days.

(21) Appl. No.: 13/865,889

(22) Filed: Apr. 18, 2013

(65) Prior Publication Data

US 2013/0283037 A1   Oct. 24, 2013

Related U.S. Application Data

(60) Provisional application No. 61/625,838, filed on Apr. 18, 2012.

(51) Int. Cl.
*H04L 29/06* (2006.01)
*H04L 1/18* (2006.01)
*H04L 12/707* (2013.01)

(52) U.S. Cl.
CPC ............. *H04L 1/1809* (2013.01); *H04L 45/24* (2013.01); *H04L 63/0272* (2013.01); *H04L 63/04* (2013.01); *H04L 65/4015* (2013.01); *H04L 65/602* (2013.01); *H04L 65/80* (2013.01); *H04L 1/1819* (2013.01); *H04L 63/162* (2013.01)

(58) Field of Classification Search
CPC .................................................... H04L 1/1809
See application file for complete search history.

(56) References Cited

U.S. PATENT DOCUMENTS 6,167,060 A * 12/2000 Vargo ................... H03M 13/03
                                                              370/468
8,397,064 B2 * 3/2013 Khermosh ............ H04L 63/162
                                                              380/256
(Continued)

FOREIGN PATENT DOCUMENTS

FR           2895181 A1      6/2007
JP         S63-181549 A      7/1988
(Continued)

OTHER PUBLICATIONS

Li Yi et al., SmartTunnel: Achieving Reliability in the Internet, Department of Computer Sciences, University of Texas at Austin, pp. 830-838, XP031093638.

(Continued)

*Primary Examiner* — Saleh Najjar
*Assistant Examiner* — Simon Kanaan
(74) *Attorney, Agent, or Firm* — Miles & Stockbridge P.C.

(57) ABSTRACT

Systems and methods of redundancy for real time communications are disclosed. One such system includes a first device and a second device, where the first device includes a redundant tunneled services element (RTSE) and the second device includes a redundant tunnel services control function (RTSCF). The RTSCF is in communication with the RTSE and is operable to establish a redundant secure tunnel to the RTSE. The RTSE is operable to redundantly convey a first stream of media packets over the redundant secure tunnel to the RTSCF. The RTSCF is operable to redundantly convey a second stream of media packets over the redundant secure tunnel to the RTSE.

25 Claims, 12 Drawing Sheets

(56) References Cited

U.S. PATENT DOCUMENTS

| | | | |
|---|---|---|---|
| 9,137,209 B1* | 9/2015 | Brandwine | H04L 63/0272 |
| 2002/0051464 A1* | 5/2002 | Sin et al. | 370/466 |
| 2002/0141413 A1 | 10/2002 | Schlaegl | |
| 2003/0212817 A1* | 11/2003 | Matthews | H04L 12/2854 |
| | | | 709/238 |
| 2004/0252700 A1 | 12/2004 | Anandakumar et al. | |
| 2007/0113140 A1 | 5/2007 | Roh et al. | |
| 2008/0076438 A1 | 3/2008 | Chang | |
| 2009/0122990 A1 | 5/2009 | Gundavelli et al. | |
| 2010/0217971 A1* | 8/2010 | Radhakrishnan | H04L 69/22 |
| | | | 713/153 |
| 2010/0226246 A1* | 9/2010 | Proulx | H04L 12/4633 |
| | | | 370/228 |
| 2012/0179849 A1 | 7/2012 | Mizutani | |

FOREIGN PATENT DOCUMENTS

| | | |
|---|---|---|
| JP | H11-163926 A | 6/1996 |
| JP | 2006203313 A | 8/2006 |
| JP | 2009-130405 A | 6/2009 |
| JP | 2010-278845 A | 12/2010 |
| WO | WO2011/114994 A1 | 9/2011 |

OTHER PUBLICATIONS

Acme Packet, et al., PseudoCR for TR 33.Sde: Proposed Text for "Candidate Solutions" Section of the Technical Report for iFire SID, 3GPP TSG SA WG3 (Security) Meeting #66, Feb. 6-10, 2012, Vancouver, Canada.

* cited by examiner

REDUNDANCY FOR REAL TIME COMMUNICATIONS

CROSS REFERENCE TO RELATED APPLICATIONS

This application claims the benefit of U.S. Provisional Application No. 61/625,838, filed Apr. 18, 2012, which is incorporated by reference herein.

TECHNICAL FIELD

The present disclosure relates to Internet voice and data services.

BACKGROUND

Many enterprises have moved from telephony services using the Public Switched Telephone Network (PSTN), provided by a traditional telephone company, to telephony services using the Internet Protocol (IP), provided by an IP Telephony service provider. Such services are commonly known as Voice over IP (VoIP) or IP Telephony.

Now that an IP network, such as the public Internet or a private IP network, can be used as a backbone rather than the limited PSTN, IP Telephony has the capability of providing advanced features such as video conferencing, call recording, and call forwarding, to name a few. However, the primary use of IP Telephony service is still to connect IP Telephony callers to PSTN callers.

For this reason, the signaling infrastructure (e.g., proxies, application servers, etc.) utilized by the IP telephony service provider is designed to allow many different types of endpoints to access the less feature-rich services provided by PSTN gateways. The service provider often manipulates and/or normalizes traffic. Such manipulation may include, for example, translation to a least common denominator codec, manipulating/removing certain SIP headers, etc. Such manipulations can interfere with advanced IP telephony services that serve to differentiate IP telephony from PSTN telephony.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
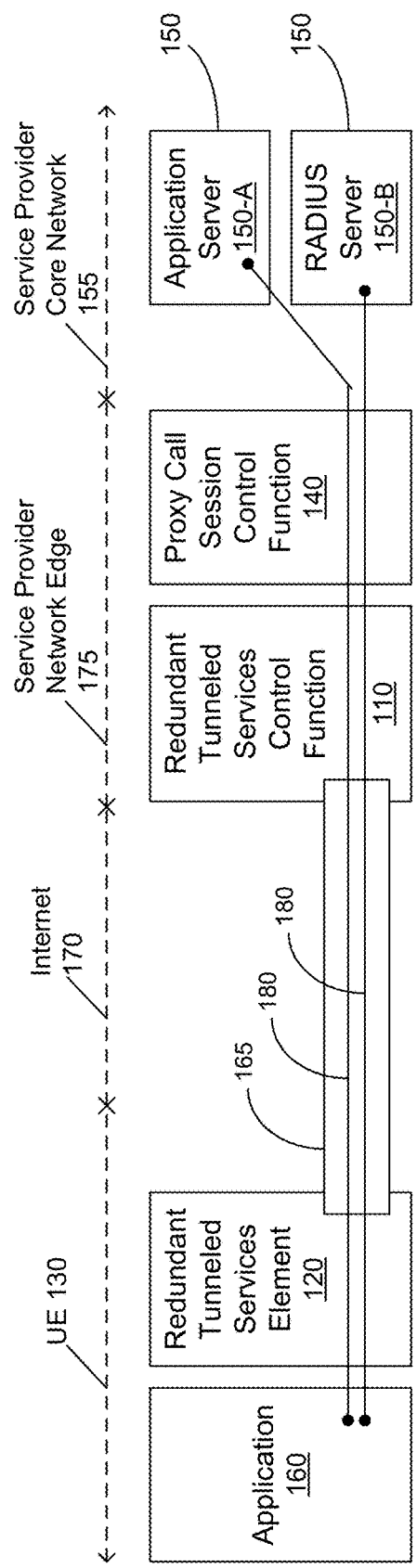
FIG. 1 is a system diagram of a network environment for real time communication (RTC) service, according to some embodiments disclosed herein.

FIG. 1 is a system diagram of a network environment that provides real time communication (RTC) services in a secure manner. As used herein, real time communication (RTC) is any mode of communication in which all users can exchange information instantly or with negligible latency. Thus, in this context, the term "real time" is synonymous with "live." Applications for such real time communication may include, for example, voice call, video call, application streaming, and remote desktop applications.

In such a network environment, security for end user traffic may be provided through firewalls, proxies, and other security devices residing within the network. The network may also utilize administrative privileges to assert control over the end user traffic. The techniques described herein allow designated application traffic to be securely channeled between end users and remote servers while also traversing security devices such as firewalls. The techniques disclosed herein further address call quality, latency, and/or jitter by providing various redundancy mechanisms.

The network environment 100 shown in FIG. 1 includes a Redundant Tunneled Services Control Function 110 (RTSCF) and a Redundant Tunneled Services Element 120 (RTSE). RTSCF 110 and RTSE 120 form a real time communication system. RTSCF 110 is located on the network side and RTSE 120 is located on the user side. More specifically, RTSCF 120 is part of, or is on the same side as, a user element 130 (UE) and RTSCF 110 is part of, or is on the same side as, a proxy call session control function 140 (P-CSCF). P-CSCF in turn communicates with one or more Core Network Elements 150, which may be a server such as an application server 150-A or Remote Authentication Dial In User Service (RADIUS) server 150-R. Such Core Network Elements 150 make up the Service Provider Core Network 155. On the user-element side, RTSE 120 may communicate with a Real Time Communication (RTC) application 160 such as a SIP or Rich Communication Services application.

RTSCF 110 and RTSE 120 cooperate to establish and maintain redundant secure tunnels 165. Communication between RTSCF 110 and RTSE 120 is governed by an RTSCF control protocol. Each of redundant secure tunnels 165 is in turn implemented using one or more secure tunnels. That is, RTSCF 110 and RTSE 120 provide redundancy for a particular secure tunnel, such as a Transport Layer Security (TLS) tunnel or Datagram Transport Layer Security (DTLS) tunnels. As used herein, the term "TLS" refers to connections created using the protocol specified in RFC 2246, RFC 4346 or RFC 5246, and "DTLS" refers to connections created using the protocol specified in RFC 6347 or RFC 5248.

Redundant secure tunnels 165 extend from UE 130, through the Internet 170, over to the service provider network edge 175. RTSCF 110 and RTSE 120 transport various media flows 180 or streams to a UE 130 over these redundant secure tunnels 165. More specifically, RTSCF 110 and RTSE 120 transport the payloads of these media flows 180, where these payloads include real time traffic such as IP Multimedia Subsystem traffic, Voice over IP traffic, or Rich Communication Services (RCS) traffic. RTSCF 110 and RTSE 120 provide some form of redundancy for the real time traffic. RTSCF 110 also relays control messages over redundant secure tunnels 165, which may take the form of proxy call session control function (P-CSCF) messages.

In some embodiments, a redundant secure tunnel 165 may be shared between multiple applications that provide real time communication (RTCO services, such as those using Session Initiation Protocol (SIP), Real-time Transport Protocol (RTP), and Message System Relay Protocol (MSRP), among others. In other embodiments, each RTC application 160 on an UE 130 utilizes its own redundant secure tunnel 165.

Transporting real time communications over a best effort network such as the Internet can result in reduced call quality, due to packet loss and jitter. Some VoIP codecs, such as G.729a, have built-in recovery mechanisms that can conceal some degree of packet-based errors in the audio or speech stream without significant audio quality degradation. However, these codec concealment algorithms may not eliminate the effects of jitter, and large amounts of remaining jitter decrease the speech quality significantly. Furthermore, when TCP/TLS transport is used to traverse strict (i.e., non-IMS-aware) firewalls, the characteristics of the transport mechanism further aggravate the natural amount of burstiness or jitter. When this jitter exceeds the jitter buffer tolerance, the result is packet loss with a further reduction in voice quality.

The embodiments described herein address voice quality and jitter by providing redundant secure tunnel 165, which uses a selected mechanism for conveying user payload over a secure tunnel in a redundant fashion. Multiple mechanisms are described herein for use with tunnel transports such as TLS and DTLS. While TLS and DTLS implementations are described herein, the techniques disclosed here are applicable to other tunnel transport mechanisms. Furthermore, the embodiments described herein are not specific to any particular real time protocol and can be used for any type of real time communication (RTC) traffic.

RTSCF 110 provides a redundant service for, or on, a secure tunnel. The secure tunnel which forms the basis of the redundant secure tunnel 165 may be specified by RTSCF 110 as a socket. In some embodiments, the secure redundant service is requested at the time of socket creation. In other embodiments, RTSCF 110 enables secure redundancy by setting a socket option on an already-created socket. In some embodiments, RTSE 120 can specify a particular redundancy factor or degree of redundancy for the socket. Redundancy factors will be described in further detail below.

Some embodiments of RTSE 120 enable the redundancy of a socket dynamically, for example, when a jitter buffer is empty or is reaching empty. Such embodiments of RTSE 120 may then disable the redundant capability when the feature is not needed. Similarly, some embodiments of RTSE 120 dynamically modify the degree of redundancy of a socket in response to conditions experienced by the real time communications application that is using the secure redundant tunnel feature.

Various redundancy mechanisms are described herein, including time-staggered copies of packets on a single tunnel, round-robin transmission of packets across multiple tunnels, and time-staggering or striping across multiple tunnels. Some embodiments of RTSCF 110 support multiple redundancy mechanisms, such that an appropriate mechanism can be selected and provisioned depending on network conditions and tunnel transport type. Although described herein with reference to secure tunnels, the redundancy techniques disclosed herein are also application to tunnels without security.

An overview of redundant tunneling will now be provided. To begin, a client application (e.g., SIP or Rich Communication Services application) provisions a redundancy mechanism on a RTSE 120. RTSE 120 then initiates a Client Service Request message toward RTSCF 110. The Client Service Request message specifies connection information (e.g., application-assigned IP address and port), a particular redundancy mechanism, and (optionally) a particular redundancy factor. In some embodiments, the connection can be specified using a socket identifier. RTSCF 110 responds to the Service Request with a Client Service Response message to indicate readiness to provide and accept this service. In some embodiments, particular RTC redundancy mechanisms may be made available by RTSCF 110 based on the tunnel type (TLS or DTLS) of the currently established tunnel between TSE and TSCF. Thus, in some scenarios, the Client Service Request may fail if the redundancy mechanism is not appropriate for current tunnel type. When the transport type of the tunnel is TLS/TCP, RTSCF 110 may provide RTSE 120 with a list of TSIDs (tunnel session identifiers), one for each auxiliary (redundant) tunnel created by the request. The identifier list may be provided as part of the Client Service Response, or may be provided in a separate message.

Figure 2:
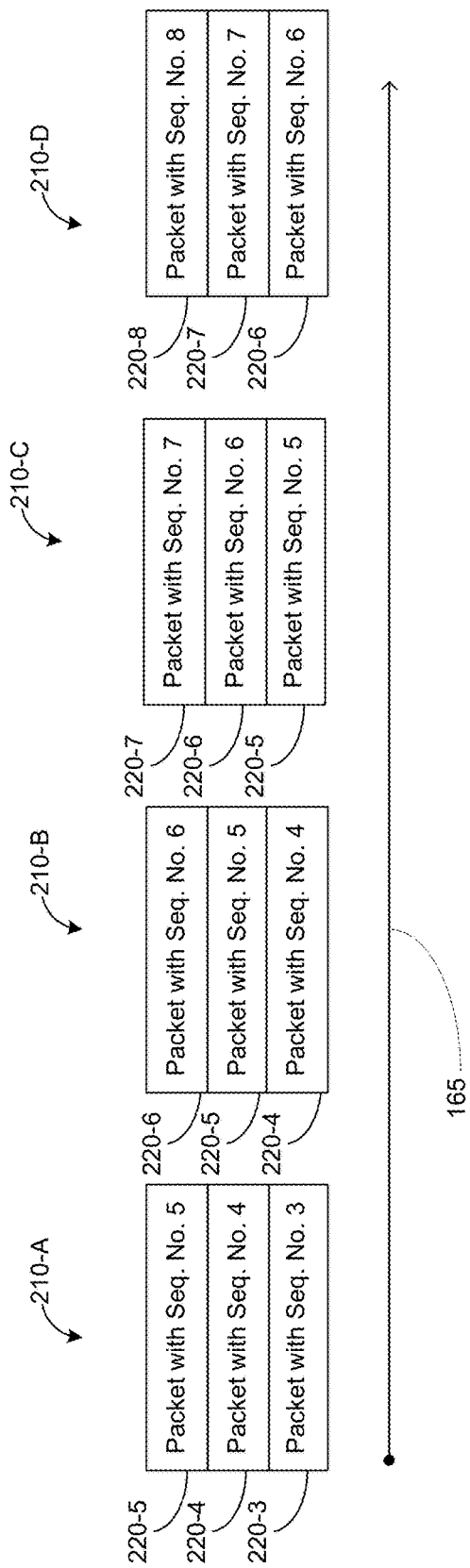
FIG. 2 is a diagram showing an example sequence of packets transported using a time-staggered redundancy mechanism, according to some embodiments disclosed herein.

FIG. 2 is a diagram illustrating one redundancy mechanism, one that uses time-staggered copies of packets on a single tunnel. In this mode, no additional redundant tunnels are required or created, and the existing secure tunnel operates as a redundant tunnel 165. The time-staggered single tunnel mechanism may be used, for example, when the underlying tunnel uses DTLS/UDP as a transport. In this redundancy mode the sender (corresponding to either RTSCF 110 or RTSE 120) transmits frames 210 that combine multiple RTC encapsulated packets 220. Each frame 210 includes the most recent (not previously transmitted) encapsulated RTC packet 220 along with a copy of N previously-transmitted encapsulated RTC packets 220. Here, N is the number of additional (time staggered) copies, specified by the client as the redundancy factor or redundancy degree.

In the example scenario illustrated in FIG. 2, the redundancy factor is 2, so the sender uses the single tunnel 165 to transmit two previously-transmitted packets 220 along with the newest packet 220. In this example, packet number 5 (i.e., sequence number of 5) is the most recent, and packet numbers 3 and 4 have already been transmitted. Thus, frame 210-A includes packet 220-3 (sequence number 3), packet 220-4 (sequence number 4), and packet 220-5 (sequence number 5). Similarly, the next transmitted frame is frame 210-B, which includes packet 220-4, packet 220-5, and packet 220-6. Next is frame 210-C, which includes packet 220-5, packet 220-6, and packet 220-7. The last one in the depicted sequence is frame 210-D, which includes packet 220-6, packet 220-7, and packet 220-8.

The time staggered single tunnel mechanism selects redundant packets based on a sliding window methodology. The receiver keeps track of the last N packet sequences it expects to receive, where N is a preconfigured parameter.

The Sliding Window algorithm can be described by the following pseudo code:

```
List = { }   // empty
Head_sequence = 0;
// Upon receiving RTC packet Sequence i
if (i > Head_sequence)
    do
        Remove all sequences smaller than (i − n)
        Populate all sequences in the range i-1 to
(Head_sequence + 1) in the List
        Head_sequence = i
        Forward packet to application
else if (i > (Head_sequence − n))
    if (i is on the expected list)
        do
            Remove from the list;
            Forward packet to application
    else
        do
            Drop packet
else
    do
        Drop packet
```

Figure 3:
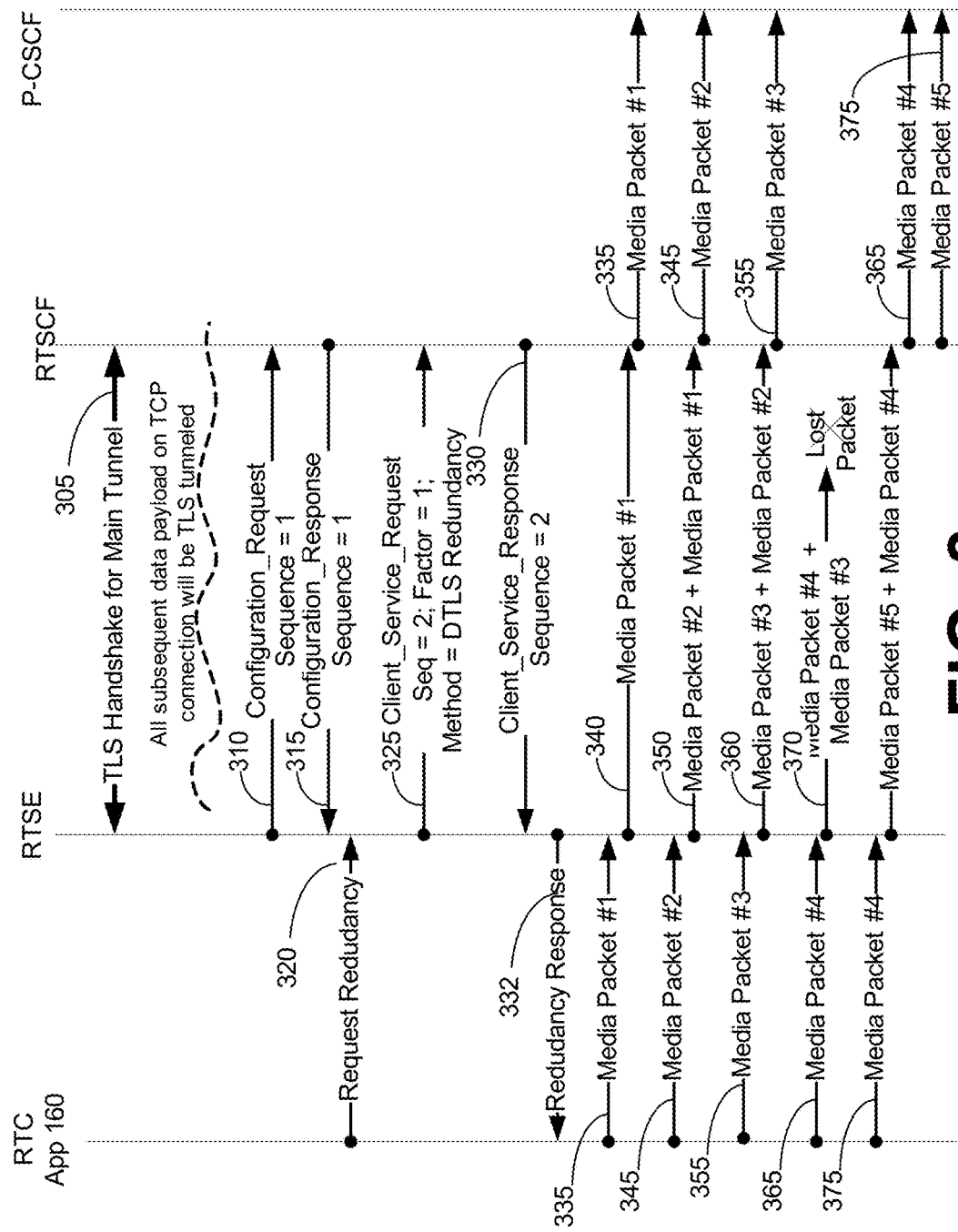
FIG. 3 is a message flow diagram showing set-up and packet transport using a time-staggered redundancy mechanism, according to some embodiments disclosed herein.

FIG. 3 is a message diagram illustrating an example message flow for the time-staggered single tunnel mechanism discussed above in connection with FIG. 2. The sequence begins with a series of messages (305) exchanged between RTSCF 110 or RTSE 120 to set up a secure tunnel. For example, for embodiments that use the TLS protocol to provide a secure tunnel, a TLS handshake is used to create and provision the tunnel. Other mechanisms for creating and maintaining secure tunnels can also be utilized, with appropriate handshaking as would be understood by a person of ordinary skill in the art.

Once the secure tunnel is established, RTSCF 110 and RTSE 120 convey real time traffic over the secure tunnel on behalf of their respective endpoints, RTC application 160 and P-CSCF 140. RTSCF 110 and RTSE 120 may exchange configuration request and response messages 310 and 315. At some point, RTC application 160 sends a message 320 to RTSE 120, requesting redundancy on the secure tunnel. RTSE 120 passes the redundancy request on to RTSCF 110 as a Client Service Request message 325, which may include parameters indicating a particular redundancy mechanism and a particular redundancy factor. In this example, Time_Staggered is specified as the redundancy mechanism and the redundancy factor is 1. If no such parameters are included, RTSCF 110 may utilize appropriate default values.

RTSCF 110 responds with a Client Service Response message 330 that indicates whether the request succeeded. This notification may include RTSE 120 in turn notifies RTC application 160 through response 332 whether the redundancy request succeeded. At this point, a redundant secure tunnel 165 has been established between RTSCF 110 and RTSE 120.

Real time communication traffic is then conveyed across redundant secure tunnel 165 as follows. In this example, the real time communicate traffic corresponds to RTP packets, but other types of media packets are also supported. RTC application 160 provides a first media packet 335 to RTSE 120 for conveyance across redundant secure tunnel 165. RTSE 120 encapsulates this media packet 335 with a redundancy header, including a sequence number, producing frame 340. Since this is the first packet in a series, frame 340 sent across redundant secure tunnel 165 includes only the first media packet 335. RTSCF 110 de-encapsulates frame 340 by removing the redundancy header, and provides the resulting media packet 335 to proxy call session control function (P-CSCF) 140. P-CSCF 140 in turn provides media packet 335 to a server 150-A (not shown) which acts as a peer to RTC application 160, such a SIP server or a RADIUS server.

When RTC application 160 provides the second media packet 345, RTSE 120 encapsulates this media packet with a redundancy header, including the next sequence number. Since this is the not the first packet in the series, frame 350 sent across redundant secure tunnel 165 includes a copy of the previous N media packets where N is the redundancy factor for the tunnel, as well as the new media packet. In this example, N=1, so frame 350 includes a copy of the (already-transmitted) first media packet 335 and also includes the second media packet 345. RTSCF 110 de-encapsulates frame 350 and uses the sliding window (described above) to discover that the copy of first media packet 335 is a duplicate of a successfully-transmitted media packet, and so discards the copy of first media packet 335. The sliding window also indicates that the other media packet 345 in frame 350 is not a duplicate but is instead a first occurrence of this particular media packet, so RTSCF 110 provides media packet 345 to P-CSCF 140. P-CSCF 140 in turn forwards media packet 345 to a server 150-A.

RTSE 120 receives another media packet 355 from RTC application 160 and encapsulates media packet 355 with a redundancy header having the next sequence number. Frame 360 sent across redundant secure tunnel 165 includes a copy of the previous N media packets (i.e., media packet 345) as well as not-yet-transmitted media packet 355. RTSCF 110 de-encapsulates frame 360 and uses the sliding window (described above) to discover that the copy of second media packet 345 is a duplicate of a successfully-transmitted media packet, and so discards the copy of first media packet 345. The sliding window also indicates that the other media packet 355 in frame 350 is not a duplicate, so RTSCF 110 provides media packet 355 to P-CSCF 140. P-CSCF 140 in turn forwards media packet 355 to a server 150-A.

Continuing on, RTSE 120 receives another media packet 365 from RTC application 160 and encapsulates media packet 365 with a redundancy header having the next sequence number. Frame 370 sent across redundant secure tunnel 165 includes a copy of media packet 355 as well as not-yet-transmitted media packet 365. In this example scenario, media packet 365 is lost, i.e., is not successfully transmitted across redundant secure tunnel 165, and RTSCF 110 does not receive frame 370. In an alternative scenario, RTSCF 110 may receive frame 370, but media packet 365 within frame 370 may be corrupted.

Continuing on, RTSE 120 receives another media packet 375 from RTC application 160 and encapsulates media packet 375 with a redundancy header having the next sequence number. Frame 380 sent across redundant secure tunnel 165 includes a copy of media packet 365 as well as not-yet-transmitted media packet 375. RTSCF 110 de-encapsulates frame 380 and learns through the sliding window that the copy of fourth media packet 365 is not a duplicate as expected, but is instead a newly-transmitted media packet. Therefore, instead of discarding the copy of fourth media packet 365 as a duplicate, RTSCF 110 forwards both media packet 365 and media packet 375 to P-CSCF 140. P-CSCF 140 in turn forwards media packet 355 to a server 150-A.

The embodiment described in FIGS. 2 and 3 provide redundancy over a single secure tunnel by transmitting multiple copies of a media packet on that tunnel. Put another way, the embodiment of FIGS. 2 and 3 staggers the media packets across time. Other embodiments will now be described that utilize multiple secure tunnels to provide redundancy. As described below, some embodiments may combine duplicate packets and multiple tunnels.

Figure 4:
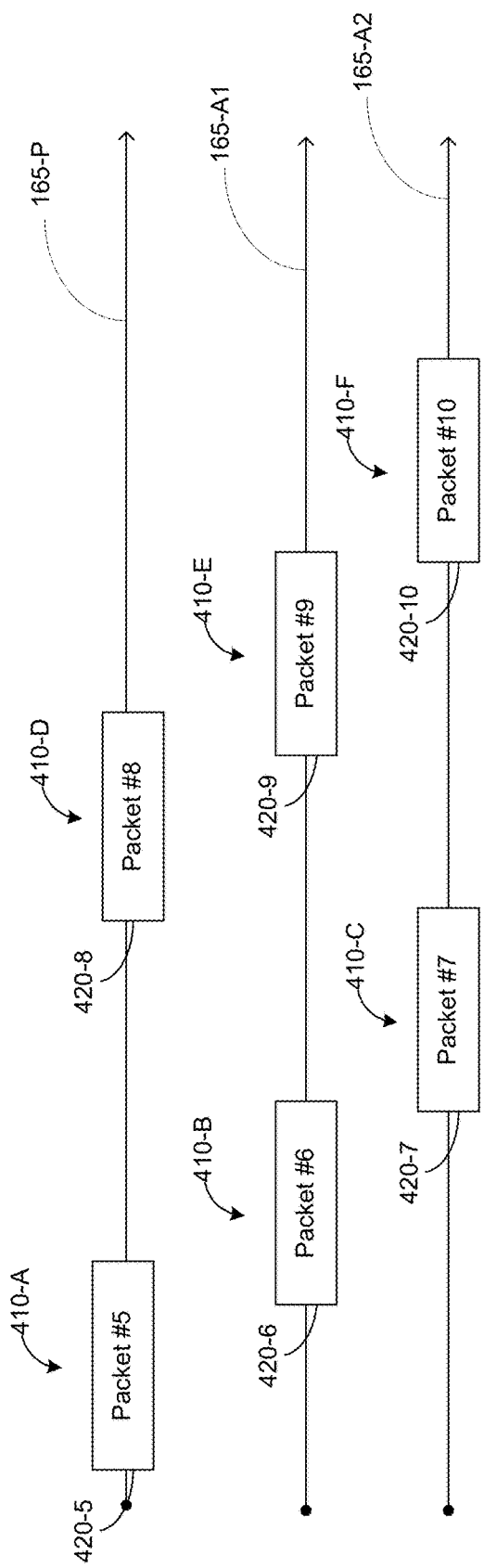
FIG. 4 is a diagram showing an example sequence of packets transported using a round-robin redundancy mechanism, according to some embodiments disclosed herein.

FIG. 4 is a block diagram illustrating another redundancy mechanism, one that uses round-robin transmission of packets across multiple tunnels. In some embodiments, this mechanism is supported when the tunnel uses TLS/TCP as a transport. In this redundancy mode, RTSCF 110 and RTSE 120 cooperate to set up additional secure tunnels. Such additional tunnels may be referred to herein as "auxiliary tunnels," with the tunnel existing at the time of the redundancy request being referred to as the "main tunnel" or "primary tunnel." The primary tunnel and the auxiliary tunnels then cooperate to provide, in the aggregate, redundancy. In this embodiment, the number of tunnels N is specified as the redundancy factor in the Client Service Request.

In this mode, N secure tunnels are established between a sender (one of RTSCF 110 and RTSE 120) and a receiver (the other of RTSCF 110 and RTSE 120). The sender obtains a stream of media packets from a client (RTC application 160 or CNE 150), and each packet in the stream is assigned to one of the N secure tunnels. The sender then transmits the payload in each streaming media packet to the receiver over its assigned tunnel. In this embodiment, each packet is assigned to, and transmitted on, only one tunnel. In a load balanced configuration, the packets are evenly distributed by assigning 1/N of the packets to each of secure tunnels.

The sender (corresponding to either RTSCF 110 or RTSE 120) transmits a series of frames 410, each subsequent frame 410 being sent on the next tunnel (1 to N+1) in a round-robin or circular fashion. In the example scenario illustrated in FIG. 4, the redundancy factor is 2, indicating a total of 3 tunnels: one primary and 2 auxiliary tunnels. In this particular example, the first frame 410-A, which includes packet 420-5 (i.e., sequence number of 5), is transmitted on the primary tunnel 165-P. Then frame 410-B is transmitted on auxiliary tunnel 165-A1, and includes the next packet 420-6 (i.e., sequence number of 6). After that, frame 410-B (i.e., sequence number of 8) is transmitted on the next tunnel, auxiliary tunnel 165-A2. Frame 410-C includes the next packet 420-7 (i.e., sequence number of 8). The sequencing through N tunnels then repeats, in a round-robin fashion: frame 410-D with packet 420-8 on primary tunnel 165-P; frame 410-E with packet 420-9 on auxiliary tunnel 165-A1; frame 410-F with packet 420-10 on auxiliary tunnel 165-A2.

In the example scenario illustrated in FIG. 4, the sequencing is performed in a strict round-robin fashion, such that the sequence of tunnels is fixed. In other embodiments, the sequence may vary, for example, an increasing sequence of 1 to N followed by a decreasing sequence of N-1 back down to 1. Such a sequence is sometimes referred to as a "snake" or "zig-zag." Also, only a single RTC packet 420 is carried within each frame 410 in the embodiment shown in FIG. 4, but other embodiments may carry more than one RTC packet 420 per frame 410.

Figure 5:
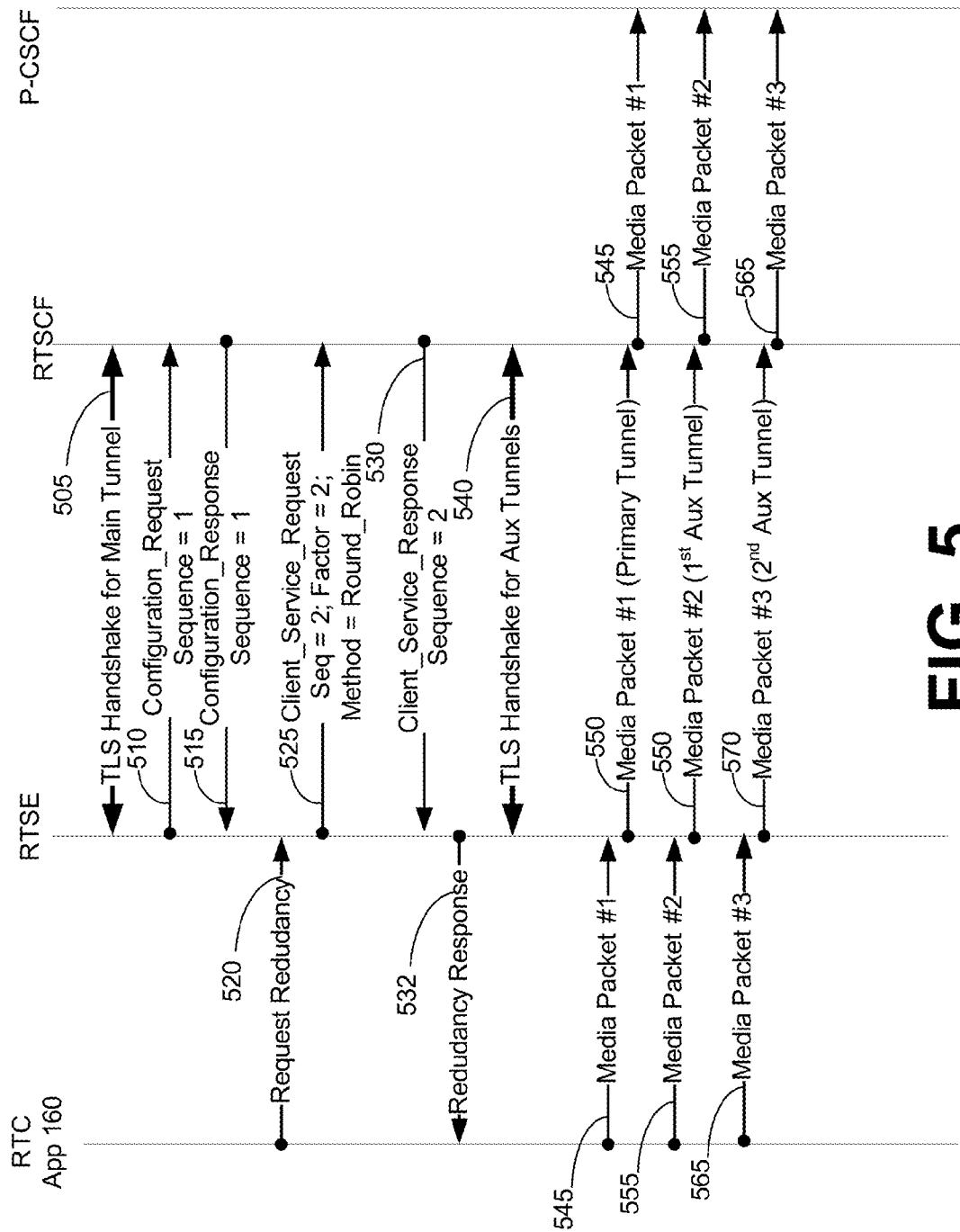
FIG. 5 is a message flow diagram showing set-up and packet transport using a round-robin redundancy mechanism, according to some embodiments disclosed herein.

FIG. 5 is a message diagram illustrating an example message flow for the round-robin multiple tunnel mechanism discussed above in connection with FIG. 4. The sequence begins with a series of messages (505) exchanged between RTSCF 110 and RTSE 120 to set up a first secure tunnel, which operates as the primary tunnel. Embodiments that use the TLS protocol to provide a secure tunnel may use a TLS handshake to create and provision the tunnel. Other mechanisms for creating and maintaining secure tunnels can also be utilized, with appropriate handshaking as would be understood by a person of ordinary skill in the art.

Once the secure tunnel is established, RTSCF 110 and RTSE 120 convey real time traffic over the secure tunnel on behalf of their respective endpoints RTC application 160 and P-CSCF 140. RTSCF 110 and RTSE 120 may exchange configuration request and response messages 510 and 515. At some point, RTC application 160 sends a message 520 to RTSE 120, requesting redundancy on the secure tunnel. RTSE 120 passes the redundancy request on to RTSCF 110 as a Client Service Request message 525, which may include parameters indicating a particular redundancy mechanism and a particular redundancy factor. In this example, Round_Robin is specified as the redundancy mechanism and the redundancy factor is 2. If no such parameters are included, RTSCF 110 may utilize appropriate default values.

RTSCF 110 responds with a Client Service Response message 530 that indicates whether the request succeeded. The Client Service Response 530 may include a list of tunnel session identifiers for the newly-created auxiliary tunnels. After receiving Client Service Response 530, RTSE 120 notifies RTC application 160 whether the redundancy request succeeded. At this point, a redundant secure tunnel 165 has been established between RTSCF 110 and RTSE 120, and redundant secure tunnel 165 includes a primary tunnel plus the number of auxiliary tunnels given by the redundancy factor. Finally, RTSCF 110 and RTSE 120 may perform a TLS handshake 540 to configure the auxiliary tunnels.

Real time communication traffic is then conveyed across redundant secure tunnel 165 as follows. In this example, the real time communicate traffic corresponds to RTP packets, but other types of media packets are also supported. RTC application 160 provides a first media packet 545 to RTSE 120 for conveyance across redundant secure tunnel 165. RTSE 120 encapsulates this media packet 545 with a redundancy header, including a sequence number, and transmits the resulting frame 550 across primary tunnel 165-P. RTSCF 110 de-encapsulates frame 550 by removing the redundancy header, and provides the resulting media packet 545 to proxy call session control function (P-CSCF) 140. P-CSCF 140 in turn provides media packet 545 to a server 150-A (not shown) which acts as a peer to RTC application 160, such a SIP server or a RADIUS server.

At a later point in time, RTC application 160 provides the second media packet 555, RTSE 120 encapsulates this media packet with a redundancy header, including the next sequence number, and transmits the resulting frame 560 across first auxiliary tunnel 165-A1. RTSCF 110 de-encapsulates frame 560 to reveal 555, which is passed to proxy call session control function (P-CSCF) 140 and then to server 150-A (not shown). The third media packet 565, is handled in a similar fashion, as can be seen in FIG. 5: media packet 565 is encapsulated, resulting in frame 570, which is transmitted over second auxiliary tunnel 165-A2. RTSCF 110 de-encapsulates frame 570 to reveal 565, which is passed to proxy call session control function (P-CSCF) 140 and then to server 150-A (not shown). As can be seen in FIG. 5, successive packets are not only transmitted on different tunnels, but are also separated in time, since packet #2 starts transmission after packet #1, packet #3 starts transmission after packet #2, etc. Each of these differentiations reduces the overall error rate. Since this round-robin mechanism does not duplicate packets error detection and/or correction may be taken care of at a higher level, e.g., TCP or TLS.

Figure 6:
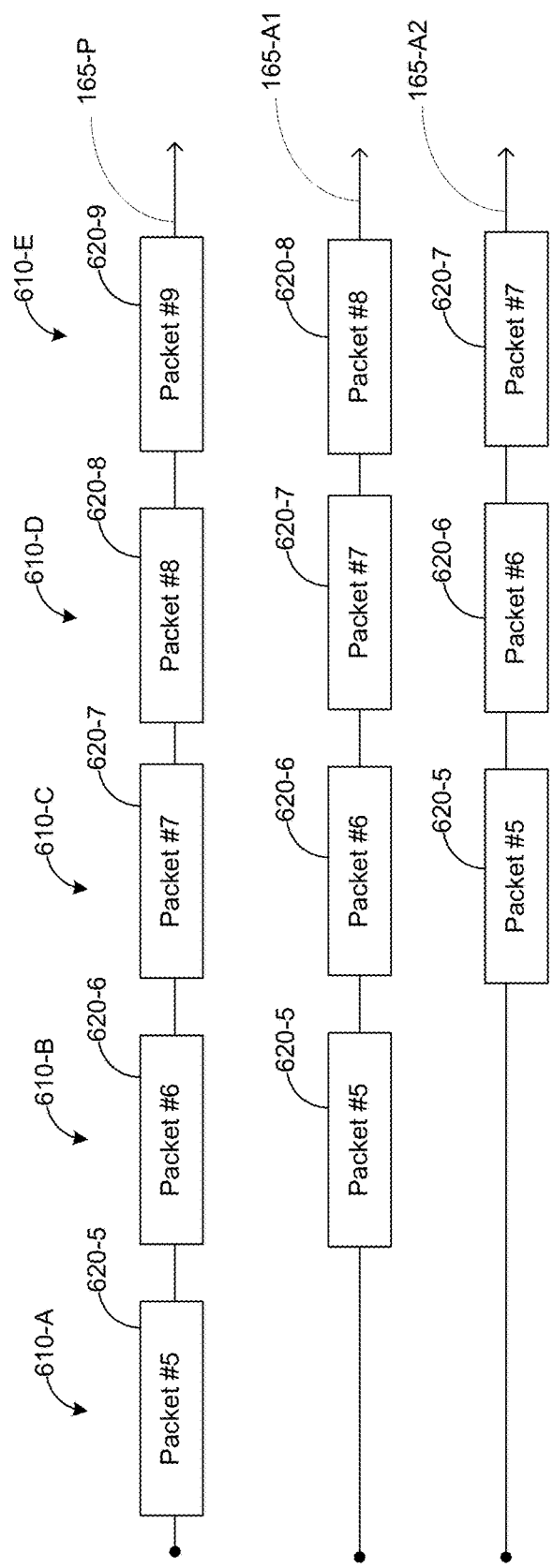
FIG. 6 is a diagram showing an example sequence of packets transported using a striping redundancy mechanism, according to some embodiments disclosed herein.

FIG. 6 is a block diagram illustrating another redundancy mechanism, one that uses time-staggering or striping across multiple tunnels. The striping multiple tunnel mechanism may be used, for example, when the tunnel uses TLS/TCP as a transport. In this redundancy mode, RTSCF 110 and RTSE 120 cooperate to set up auxiliary secure tunnels in addition to the already-existing primary tunnel. In this embodiment, the number of tunnels N is specified as the redundancy factor in the Client Service Request. Media packets are duplicated across tunnels, with the duplication being staggered in time.

In this striping across multiple tunnels mode, N secure tunnels are established between a sender (one of RTSCF 110 and RTSE 120) and a receiver (the other of RTSCF 110 and RTSE 120). The sender obtains a stream of media packets from a client (RTC application 160 or CNE 150), and each packet in the stream is first transmitted on one of the N secure tunnels and then transmitted again on another of the N secure tunnels. Thus, in this embodiment, each packet is assigned to and transmitted on multiple tunnels.

In this striping across multiple tunnels mode, both the RTSCF 110 and RTSE 120 keep track of the last received RTC sequence (provided in the redundancy header added during the encapsulation of the media packet. The receiver strips the redundancy header and forwards the payload (original packet) to corresponding applications. If received packet RTC sequence is less or equals to the previously received the packet is discarded.

This mode of operation is illustrated in FIG. 6. The sender (corresponding to either RTSCF 110 or RTSE 120) transmits a series of frames 610, each subsequent frame 610 being sent on each tunnel but staggered in time. In the example scenario illustrated in FIG. 6, the redundancy factor is 2, indicating a total of 3 tunnels: one primary and 2 auxiliary tunnels. In this particular example, the first frame 610-A, which includes media packet 620-5 (i.e., sequence number of 5), is first transmitted on primary tunnel 165-P, later transmitted on auxiliary tunnel 165-A1, and still later transmitted on auxiliary tunnel 165-A2. After transmitting frame 610-A (including packet media 620-5) on primary tunnel 165-P, the sender then transmits frame 610-B, which includes the next media packet 630-6 (i.e., sequence number of 6) on all the tunnels: primary tunnel 165-P; followed by auxiliary tunnel 165-A1; followed by auxiliary tunnel 165-A2. Frames frame 610-C, 610-D, and 610-E are handled in a similar fashion, as can be seen in FIG. 6.

Figure 7:
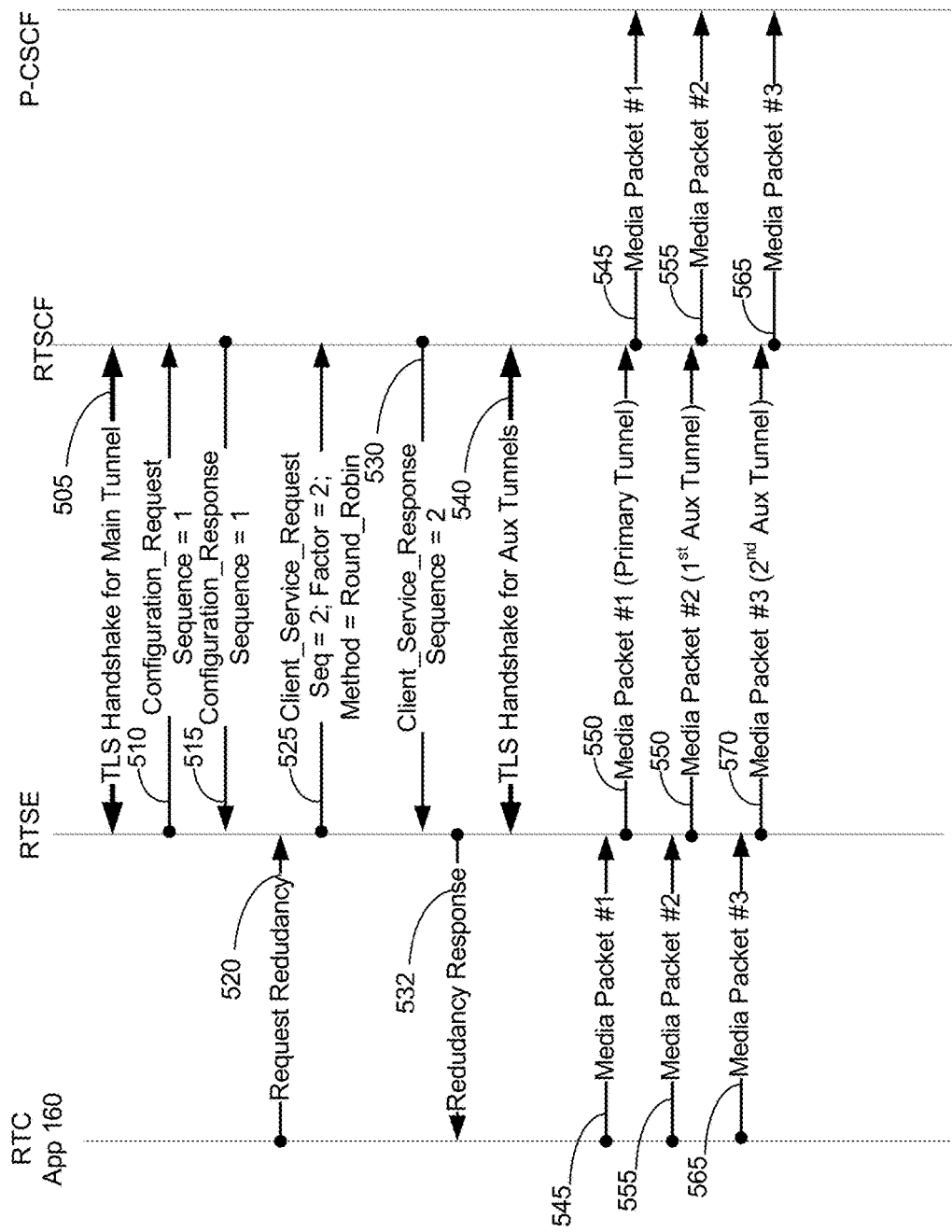
FIG. 7 is a message flow diagram showing set-up and packet transport using a striping redundancy mechanism, according to some embodiments disclosed herein.

FIG. 7 is a message diagram illustrating an example message flow for the striping multiple tunnel mechanism. The sequence begins with a series of messages (705) exchanged between RTSCF 110 or RTSE 120 to set up a first secure tunnel, which operates as the primary tunnel. Embodiments that use the TLS protocol to provide a secure tunnel may use a TLS handshake to create and provision the tunnel. Other mechanisms for creating and maintaining secure tunnels can also are utilized, with appropriate handshaking as would be understood by a person of ordinary skill in the art.

Once the secure tunnel is established, RTSCF 110 and RTSE 120 convey real time traffic over the secure tunnel on behalf of their respective endpoints RTC application 160 and P-CSCF 140. RTSCF 110 and RTSE 120 may exchange configuration request and response messages 710 and 715. At some point, RTC application 160 sends a message 720 to RTSE 120, requesting redundancy on the secure tunnel. RTSE 120 passes the redundancy request on to RTSCF 110 as a Client Service Request message 725, which may include parameters indicating a particular redundancy mechanism and a particular redundancy factor. In this example, Stripe_Across_Multiple is specified as the redundancy mechanism and the redundancy factor is 1. If no such parameters are included, RTSCF 110 may utilize appropriate default values.

RTSCF 110 responds with a Client Service Response message 730 that indicates whether the request succeeded. The Client Service Response 730 may include a list of tunnel session identifiers for the newly-created auxiliary tunnels. After receiving Client Service Response 730, RTSE 120 notifies RTC application 160 whether the redundancy request succeeded. At this point, a redundant secure tunnel 165 has been established between RTSCF 110 and RTSE 120, and redundant secure tunnel 165 includes a primary tunnel plus the number of auxiliary tunnels given by the redundancy factor. Finally, RTSCF 110 and RTSE 120 may perform a TLS handshake 740 to configure the auxiliary tunnels.

Real time communication traffic is then conveyed across redundant secure tunnel 165 as follows. In this example, the real time communication traffic corresponds to RTP packets, but other types of media packets are also supported. RTC application 160 provides a first media packet 745 to RTSE 120 for conveyance across redundant secure tunnel 165. RTSE 120 encapsulates this media packet 745 with a redundancy header, including a sequence number, and transmits the resulting frame 750 across primary tunnel 165-P. RTSE 120 also transmits resulting frame 750 across the auxiliary tunnels, which in this scenario is the single auxiliary tunnel 165-A1. In the example scenario, this transmission occurs substantially simultaneously, but in other embodiments a delay may occur.

When the first instance of frame 750 arrives, RTSCF 110 receives de-encapsulates frame 750 by removing the redundancy header, and provides resulting media packet 745 to proxy call session control function (P-CSCF) 140. When the second instance of frame 750 arrives, RTSCF 110 uses the sliding window to discover that the later arrival is a duplicate of a successfully-transmitted frame, and so discards the later instance. More specifically, both RTSCF 110 and RTSE 120 keep track of the last received RTC sequence number (found in the redundancy header) and discards an RTC packet when the RTC sequence number is less or equal to the previously received RTC sequence number.

In this scenario, the next media packet is sent by RTSCF 110 rather than RTSE 120. P-CSCF 140 provides the second media packet 755, and RTSCF 110 encapsulates this media packet with a redundancy header to include the next sequence number. The resulting frame 760 is transmitting across both tunnels: primary tunnel 165-P and auxiliary tunnel 165-A1. When the first instance of frame 760 arrives, recipient RTSE 120 de-encapsulates 760 by removing the redundancy header, and provides resulting media packet 755 to proxy call session control function (P-CSCF) 140. When the second instance of frame 760 arrives, RTSCF 110, uses the sliding window to discover that the later arrival is a duplicate of a successfully-transmitted frame, and so discards the later instance. In this example scenario, frame 750 is the first one transmitted, but is received later than frame 760 due to a delay in the primary tunnel 165-P.

Figure 8:
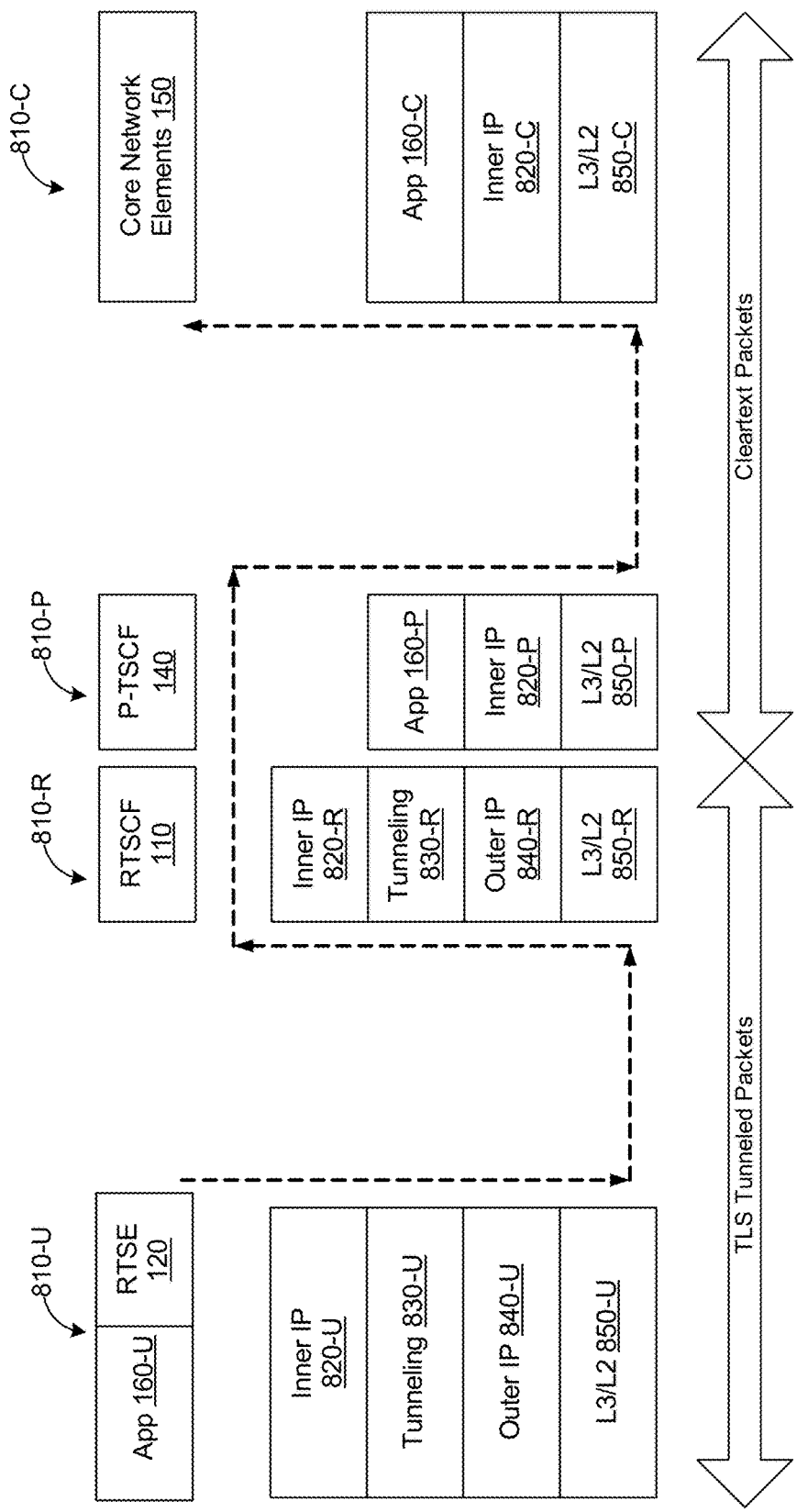
FIG. 8 is a block diagram of protocol stacks used by a redundancy tunnel system, according to some embodiments disclosed herein.

FIG. 8 illustrates the travel of media packets through various protocol stacks and layers in accordance with some embodiments of RTSCF 110 and RTSE 120. Media packets traverse a user-side stack 810-U, an RTSCF stack 810-R, a P-CSCF stack 810-P, and a CNE stack 810-C. Packets are first conveyed over a redundant secure tunnel 165 to reach P-CSCF 140, and then travel a cleartext path from P-CSCF 140 to CNE 150.

During the tunnel setup and negotiation procedure (referred to earlier in connection with FIGS. 3, 5, and 7), RTSCF 110 assigns an inner (remote) IP address to UE 130. The inner address can be locally configured on RTSCF 110, or RTSCF 110 can obtain the remote IP address through a 3GPP authentication, authorization and accounting (AAA) server, such as an AAA server located in the IP Multimedia Services (IMS) network.

All higher-layer protocols implanted by real time communication (RTC) applications 160 use the remote IP address assigned by RTSCF 110 to communicate with Core Network Elements 150. Media packets generated by an RTC application 160 travel through user-side stack 810-U and are first provided with an inner IP address by layer 820-U. Tunneling layer 830-U then provides tunneling encapsulation for the media packet. Outer transport IP layer 840-U then adds an outer IP address. Finally, the media packet passes through L2/L1 layer 850-U for transmission onto the link.

The reverse of this process happens at RTSCF 110. Packets are received on the link by RTSCF 110 and enter RTSCF stack 810-R at L2/L1 layer 850-R. The packet is passed up to outer transport layer 840-R where the outer IP address is stripped. The packet continues through TLS Tunneling layer 830-R, then inner IP layer 820-R, where the inner IP address is stripped.

Having traversed redundant secure tunnel 165, the packet is then turned around for travel back down P-CSCF stack 810-P. The de-tunneled media packet is first handled by RTC application 160-P, then remote IP layer 820-P. At this point, the packet is cleartext, and is processed by L2/L1 layer 850-P for transmission onto the link. Note that since no tunnel is involved between P-CSCF 140 and CNE 150, only one (remote) IP layer is used. The packet is received at CNE 150 and the reverse process occurs: first processing by L2/L1 layer 850-C, then remote IP layer 820-C. The media packet is finally delivered to real time communication (RTC) application 160-C.

In this manner, RTSCF 110 tunnels and de-tunnels IMS packets and forwards the inner packet from redundant secure tunnel 165 to CNE 150. Once the RTSCF 110 forwards the IMS messages to P-CSCF 140, P-CSCF 140 handles the IMS messages as specified in the 3GPP IMS specification (3GPP TS 24.229).

Figure 9:
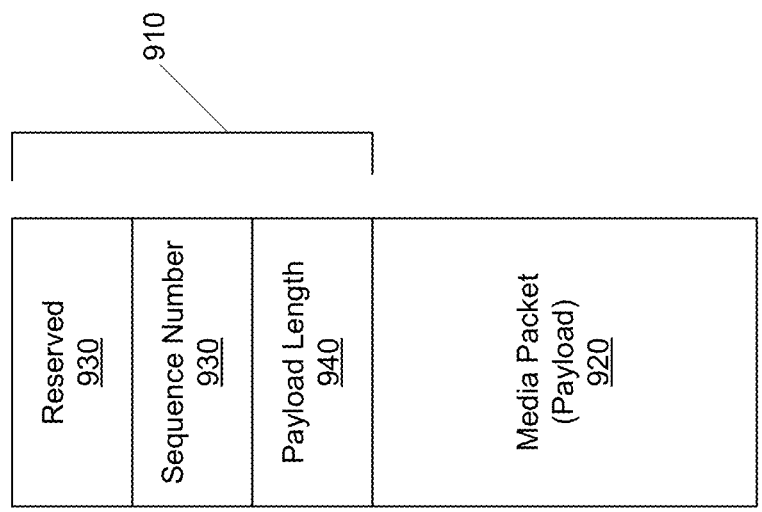
FIG. 9 is a diagram showing the format of a redundancy packet, according to some embodiments disclosed herein.

FIG. 9 illustrates the format of a redundancy packet in accordance with various embodiments described herein. Whenever RTSCF 110 enables and provisions redundancy on a particular application socket, each media packet transmitted on that socket is encapsulated by adding redundancy header 910 to the original media packet, which is thus considered payload 920. Redundancy header 910 includes sequence number field 930 and payload length field 940. Redundancy header 910 may also include one or more reserved fields 950.

Figure 10:
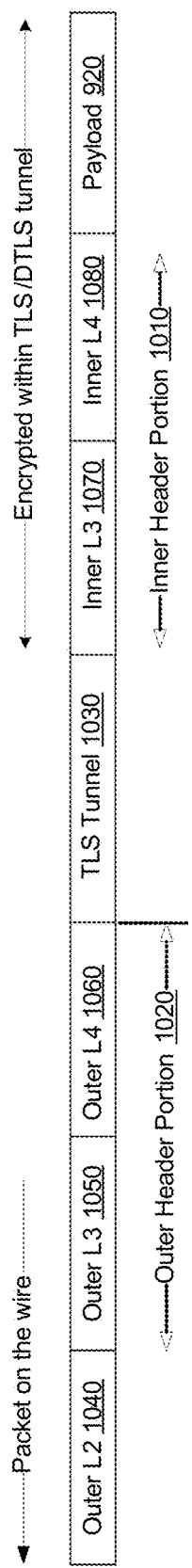
FIG. 10 is a diagram showing a media packet after redundancy and tunneling encapsulation, according to some embodiments disclosed herein.

FIG. 10 is an exploded view of a media packet, as it appears on a transmission link, after redundancy and tunneling encapsulation. When packets originating from UE 130 have traversed user-side stack 810-U and are ready for transmission a link, such packets are made up of an inner header portion 1010 and an outer header portion 1020, separated by a TLS Tunnel header 1030. Outer header portion 1020 and payload 920 are encrypted within redundant secure tunnel 165, where the remaining portions are not.

Outer header portion 1020, which is transmitted first "on the wire," contains an outer L2 header 1040, followed by an outer L3 header 1050, followed by an outer L4 header 1060. TLS Tunnel header 1030 is next on the wire. Next to be transmitted is Inner header portion 1010, which contains an inner L3 header 1070 and an inner L4 header 1080. Last on the wire is payload 920. The existence of the tunnel is transparent to, or orthogonal to, the application/P-CSCF layer. In other words, the inner IP address is unmodified to accommodate TLS tunnel, operating as if the tunnel does not exist.

Figure 11:
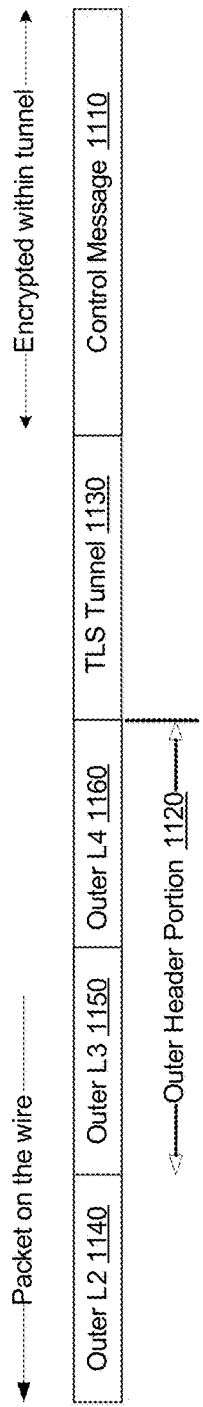
FIG. 11 is a diagram showing the format, in more detail, of a redundant packet with an application payload, according to some embodiments disclosed herein.

FIG. 11 is an exploded view of a control packet used by RTSCF 110 and RTSE 120. Control messages may be used to negotiate parameters such as keep-alive mechanism, protocol version, assignment of UE inner IP address, header compression, and authentication mechanisms. Control packets are made up of a control message 1110 and an outer header portion 1120, separated by a TLS Tunnel header 1130. Outer header portion 1120, which is transmitted first "on the wire," contains an outer L2 header 1140, followed by an outer L3 header 1150, followed by an outer L4 header 1160. TLS Tunnel header 1130 is next on the wire. Last on the wire is control message 1110.

Figure 12:
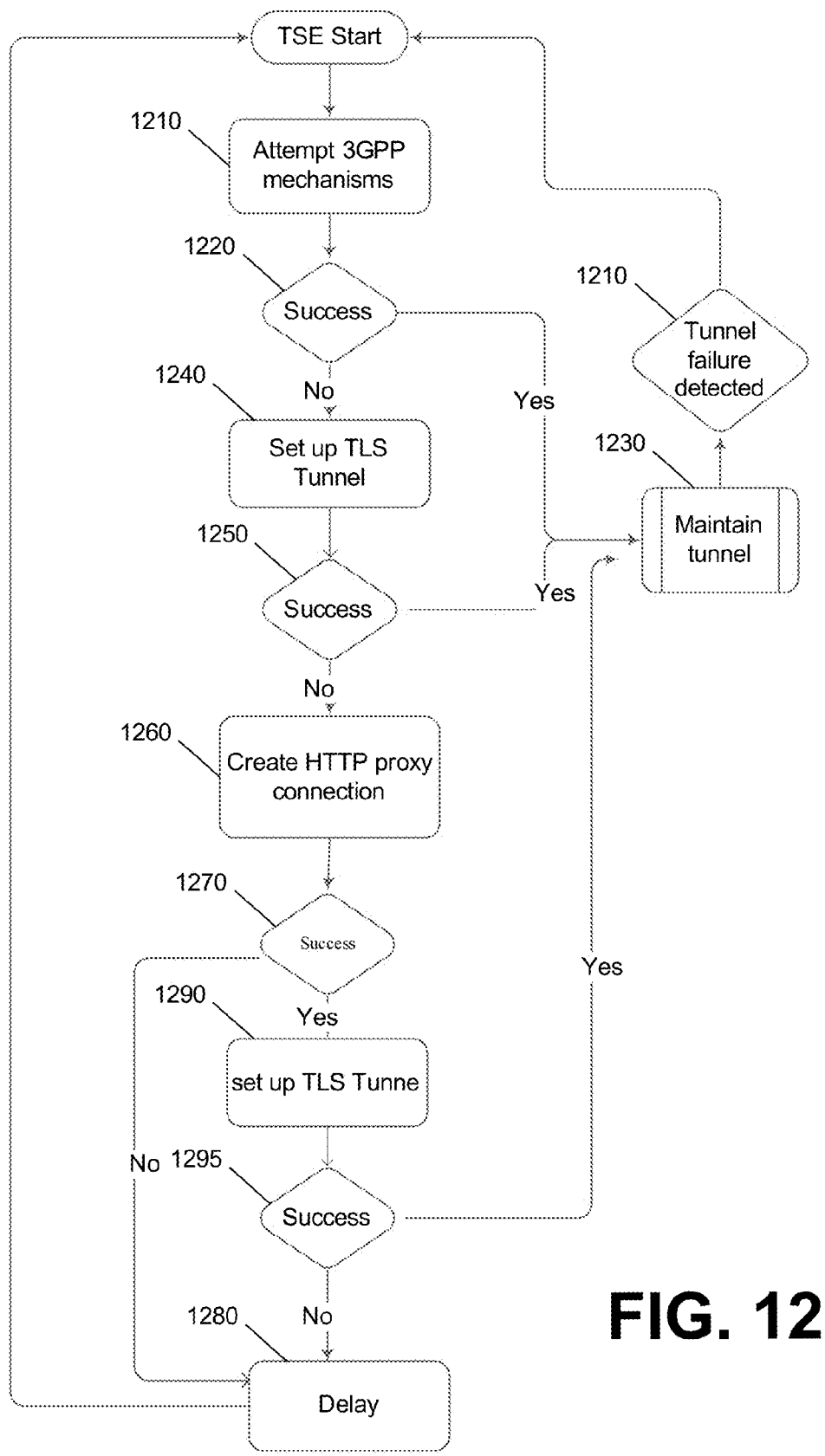
FIG. 12 is a flow chart of a redundant tunnel connection state machine, according to some embodiments disclosed herein.

FIG. 12 is a flowchart for a connection state machine used by some embodiments of RTSE 120. Such a state machine may be used to detect the presence of a non-IMS aware firewall and to traverse this firewall. To begin, at block 1210 the IMS application attempts to register according to normal procedures specified in the 3GPP spec TS 24.229. A successful registration is checked at block 1220. If registration succeeded, processing continues at block 1230, where RTSE 120 enters a state that maintains the tunnel. In some embodiments, RTSE 120 may also attempt registration using alternative procedure specified in 3GPP for NAT traversal.

However, if the registration failed, processing continue at block 1240, where RTSE 120 attempts to establish a TLS tunnel to a particular destination port on RTSCF 110 (e.g., 80/443). Block 1250 checks for successful establishment. If the TLS tunnel was successfully established, processing continues at block 1230, where RTSE 120 enters a state that maintains the tunnel. Upon tunnel establishment, RTSE 120 may also indicate to the IMS control plane and user plane protocols the presence of the non-IMS-aware (i.e., strict) firewalls. At this point, all the IMS protocols send all their traffic over the established secure tunnel. Optionally, if end to end security is not enabled, IMS protocols can disable security at the protocol level, since the TLS tunneling mechanism will provide packet level encryption and an authentication mechanism.

If the establishment of TLS tunnel is not successful, processing continues at block 1260. Such failure may indicate the possible presence of an explicit HTTP proxy. Therefore, RTSE 120 sends an HTTP CONNECT method (RFC 2616) to the default HTTP proxy in the network (e.g., port 80/443). At block 1270, RTSE 120 obtains a response to the HTTP CONNECT. If the response to HTTP CONNECT is failure, processing continues at block 1280, where RTSE 120 waits for a delay period, then starts the process again. A predetermined number of failures indicates a misconfiguration in the network and as a result, IMS services will not be run through this network.

If at block 1270 the response to HTTP CONNECT indicates success, RTSE 120 continues at block 1290, where another attempt is made to set up a TLS Tunnel to RTSCF 110. Successful set up is checked at block 1295, and upon success, processing continues at block 1230, where RTSE 120 enters a state that maintains the tunnel. If at block 1295 it is determined that the TLS Tunnel was not successfully established, processing continues at block 1280, and RTSE 120 waits for a delay period before starting the process over.

Figure 13:
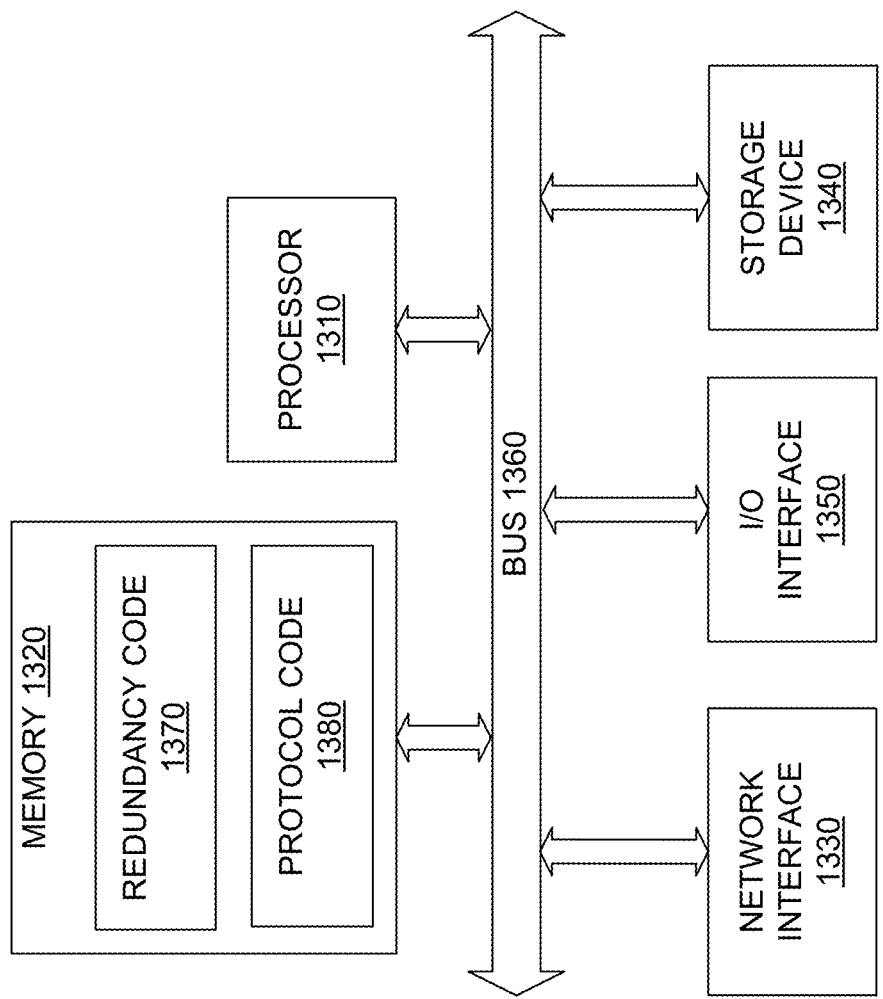
FIG. 13 is a block diagram of a network computing device that can be used to implement components of the networked system of FIG. 1, according to some embodiments disclosed herein.

FIG. 13 is a block diagram of a network device which can be used to implement embodiments of RTSCF 110 and/or RTSE 120 as disclosed herein. The network device includes a processor 1310, memory 1320, a network interface 1330, a storage device 1340 (e.g., non-volatile memory or a disk drive), and one or more input output (I/O) interfaces 1350. These hardware components are coupled via a bus 1360. Omitted from FIG. 13 are a number of components that are unnecessary to explain the operation of the network device.

The redundancy mechanism can be implemented in software (i.e., instructions executing on a processor). FIG. 13 depicts a software implementation, with memory 1320 storing redundancy code 1370 as well as protocol code 1380.

The redundancy mechanism(s) can also be implemented in specialized hardware logic. Hardware implementations include (but are not limited to) a programmable logic device (PLD), programmable gate array (PGA), field programmable gate array (FPGA), an application-specific integrated circuit (ASIC), a system on chip (SoC), and a system in package (SiP). Persons of ordinary skill should also appreciate that these components may be implemented using any combination of hardware and software.

In some embodiments of the network device, the software-implemented redundancy mechanism(s) are stored on a computer-readable medium, which in the context of this disclosure refers to any structure which can contain, store, or embody instructions executable by a processor. The computer readable medium can be, for example but not limited to, based on electronic, magnetic, optical, electromagnetic, infrared, or semiconductor technology. Specific examples of a computer-readable medium using electronic technology would include (but are not limited to) the following: a random access memory (RAM); a read-only memory (ROM); and an erasable programmable read-only memory (EPROM or Flash memory). A specific example using magnetic technology includes (but is not limited to) a disk drive; and a portable computer diskette. Specific examples using optical technology include (but are not limited to) a compact disk read-only memory (CD-ROM) or a digital video disk read-only memory (DVD-ROM).

Any process descriptions or blocks in flowcharts would be understood as representing modules, segments, or portions of code which include one or more executable instructions for implementing specific functions or steps in the process. As would be understood by those of ordinary skill in the art of the software development, alternate implementations are also included within the scope of the disclosure. In these alternate implementations, functions may be executed out of order from that shown or discussed, including substantially concurrently or in reverse order, depending on the functionality involved.

The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

At least the following is claimed:

1. A method comprising:
   combining a first media packet, a second media packet and a third media packet of a stream of media packets into a first frame, the second and third media packets being media packets that follow the first media packet in the stream;
   combining the second media packet and the third media packet of the stream with a fourth media packet into a second frame, the fourth media packet being one of the media packets that follows the third media packet in the stream;
   combining the third media packet, the fourth media packet and a fifth media packet of the stream into a third frame, the fifth media packet being one of the media packets that follows the fourth media packet in the stream; and
   transmitting the first frame, the second frame and the third frame to a receiver over a secure tunnel, the secure tunnel comprising a Transport Layer Security (TLS) or a Datagram Transport Layer Security (DTLS) tunnel;
   further comprising setting up the secure tunnel, the setting up comprising specifying a redundancy factor comprising a number of redundancy packets that are included with each transmitted frame on the tunnel;
   wherein each media packet comprises real time communication (RTC) data and is encapsulated with a redundancy header that comprises a sequence number, each media packet encapsulated before being combined into frames and being transmitted on the tunnel.

2. The method of claim 1 wherein the second media packet is the media packet immediately following the first media packet in the stream.

3. The method of claim 1 further comprising:
   for each of a selected portion of the streaming media packets, transmitting a payload of the selected streaming media packets to the receiver over the secure tunnel, wherein the secure tunnel comprises a first tunnel identifier and the transmitting over the secure tunnel comprises specifying the first tunnel identifier; and
   for each of a remaining portion of the streaming media packets, transmitting a payload of the remaining streaming media packets to the receiver over an additional secure tunnel associated with the secure tunnel, wherein the additional secure tunnel comprises a second tunnel identifier that is different than the first tunnel identifier, and the transmitting over the additional secure tunnel comprises specifying the second tunnel identifier;
   wherein the secure tunnel allows the media packets to traverse a firewall.

4. The method of claim 3 further comprising:
   for each of the selected portion of the streaming media packets, transmitting the payload of the selected streaming media packets to the receiver over the additional secure tunnel; and for each of the remaining portion of the streaming media packets, transmitting the payload of the remaining streaming media packets to the receiver over the secure tunnel.

5. The method of claim 3, wherein the transmission of the payload of each of the selected streaming media packets over the additional secure tunnel is delayed with respect to the transmission of the payload of a corresponding one of the selected streaming media packets over the secure tunnel.

6. The method of claim 1 wherein the secure tunnel corresponds to the DTLS tunnel and is configured to simultaneously transport a plurality of media flows from a user equipment (UE).

7. A method comprising:
transmitting a payload of a first media packet in a stream of media packets to a receiver over a first secure tunnel comprising a first tunnel identifier, the transmitting over the first secure tunnel comprises specifying the first tunnel identifier;
transmitting a payload of a next second media packet in the stream to the receiver over an additional second secure tunnel, comprising a second tunnel identifier that is different than the first tunnel identifier, after a first delay with respect to the transmission over the first secure tunnel, the transmitting over the additional second secure tunnel comprising specifying the second tunnel identifier;
transmitting a payload of a next third media packet in the stream to the receiver over an additional third secure tunnel, comprising a third tunnel identifier that is different than the second tunnel identifier, after a second delay with respect to the transmission over the second secure tunnel, the transmitting over the additional third secure tunnel comprising specifying the third tunnel identifier; and
repeating the transmitting the payload of the first media packet, transmitting the payload of the next second media packet and transmitting the payload of the next third media packet for the next three additional media packets in the stream;
wherein each secure tunnel comprises a Transport Layer Security (TLS) or a Datagram Transport Layer Security (DTLS) tunnel;
wherein each media packet comprises real time communication (RTC) data and is encapsulated with a redundancy header that comprises a sequence number, each media packet encapsulated before being transmitted on the tunnel.

8. The method of claim 7 wherein the next second media packet immediately follows the first media packet in the stream.

9. The method of claim 7 further comprising:
transmitting the payload of the first media packet to the receiver over the additional second secure tunnel; and
transmitting the payload of the next second media packet to the receiver over the first secure tunnel;
wherein the first and second secure tunnels allow the media packets to traverse a firewall.

10. A method comprising:
transmitting a payload of a first media packet in a stream to a receiver over a first secure tunnel comprising a first tunnel identifier, the transmitting over the first secure tunnel comprises specifying the first tunnel identifier;
transmitting the payload of the first media packet to the receiver over an additional second secure tunnel comprising a second tunnel identifier that is different than the first tunnel identifier after a first delay with respect to the transmission of the payload of the first media packet over the first secure tunnel, the transmitting over the additional second secure tunnel comprises specifying the second tunnel identifier;
transmitting a payload of a next media packet in the stream to the receiver over the first secure tunnel; and
transmitting the payload of the next media packet to the receiver over the additional second secure tunnel after a second delay with respect to the transmission of the payload of the next media packet over the second secure tunnel;
wherein each of the secure tunnels is configured to simultaneously transport a plurality of media flows from a user equipment (UE) and each secure tunnel comprises a Transport Layer Security (TLS) or a Datagram Transport Layer Security (DTLS) tunnel;
wherein each media packet comprises real time communication (RTC) data and is encapsulated with a redundancy header that comprises a sequence number, each media packet encapsulated before being transmitted on the tunnel.

11. The method of claim 10 wherein the first secure tunnel corresponds to the TLS tunnel.

12. A method performed in a transmitter, the method comprising:
establishing N secure tunnels between the transmitter and a receiver, wherein each established secure tunnel has a corresponding unique tunnel identifier;
assigning each of a stream of media packets to a secure tunnel selected from the N secure tunnels; and
transmitting a payload of each streaming media packet to the receiver over the assigned secure tunnel, the transmitting comprising specifying the corresponding unique tunnel identifier for the selected tunnel;
wherein each of the secure tunnels is configured to simultaneously transport a plurality of media flows from a user equipment (UE);
wherein each secure tunnel comprises a Transport Layer Security (TLS) or a Datagram Transport Layer Security (DTLS) tunnel;
wherein each media packet comprises real time communication (RTC) data and is encapsulated with a redundancy header that comprises a sequence number, each media packet encapsulated before being transmitted on the tunnel.

13. The method of claim 12 further comprising:
assigning 1/N of the stream of media packets to each of the secure tunnels.

14. The method of claim 13 wherein the media packets are assigned to secure tunnels in a round-robin fashion.

15. The method of claim 13 wherein each streaming media packet is assigned to a single secure tunnel and the payload of each streaming media packet is only transmitted only on the assigned secure tunnel;
wherein each secure tunnel allows the media packets to traverse a firewall.

16. The method of claim 13 further comprising:
assigning each of the stream of media packets to another secure tunnel selected from the N secure tunnels; and
transmitting a payload of each streaming media packet over the another assigned secure tunnel to the receiver.

17. A redundant real-time communication system comprising:
a first device including a redundant tunneled services element (RTSE); and
a second device including a redundant tunnel services control function (RTSCF) that is in communication with the RTSE and is operable to establish a redundant secure tunnel to the RTSE and establish a primary secure tunnel to the RTSE, wherein the primary secure tunnel comprises an associated first tunnel identifier, and the redundant secure tunnel comprises an associated second tunnel identifier that is different from the first tunnel identifier, wherein the RTSE is operable to redundantly convey a first stream of media packets over the redundant secure tunnel to the RTSCF by specifying the second tunnel identifier, or over the primary secure tunnel by specifying the first tunnel identifier, and wherein the RTSCF is operable to redundantly convey a second stream of media packets over the redundant secure tunnel to the RTSE;

wherein a redundancy mode is requested when establishing the redundant secure tunnel;

wherein the redundant secure tunnel is configured to simultaneously transport a plurality of media flows from a user equipment (UE);

wherein each secure tunnel comprises a Transport Layer Security (TLS) or a Datagram Transport Layer Security (DTLS) tunnel;

wherein each media packet comprises real time communication (RTC) data and is encapsulated with a redundancy header that comprises a sequence number, each media packet encapsulated before being transmitted on the tunnel.

18. The system of claim 17 wherein the redundant secure tunnel supports a plurality of redundancy modes and each secure tunnel allows the media packets to traverse a firewall.

19. The system of claim 18 wherein the plurality of redundancy modes includes a time staggered mode, a round-robin mode, a stripe across multiple tunnels mode, or a combination thereof.

20. The system of claim 18 wherein the RTSE is operable to request establishment of the redundant secure tunnel from the RTSCF.

21. The system of claim 20 wherein the request specifies one of the plurality of redundancy modes.

22. The system of claim 18 wherein the RTSCF is operable to select one of the plurality of redundancy modes based on a type of the secure tunnel.

23. The system of claim 18 wherein the RTSCF is operable to select one of the plurality of redundancy modes based on a type of the secure tunnel.

24. The system of claim 18 wherein the RTSCF is operable to select a time-staggered mode when the type of the secure tunnel corresponds to DTLS.

25. The system of claim 18 wherein the RTSCF is operable to select a round-robin mode when the type of the secure tunnel corresponds to TLS.

* * * * *